Patented Nov. 2, 1948

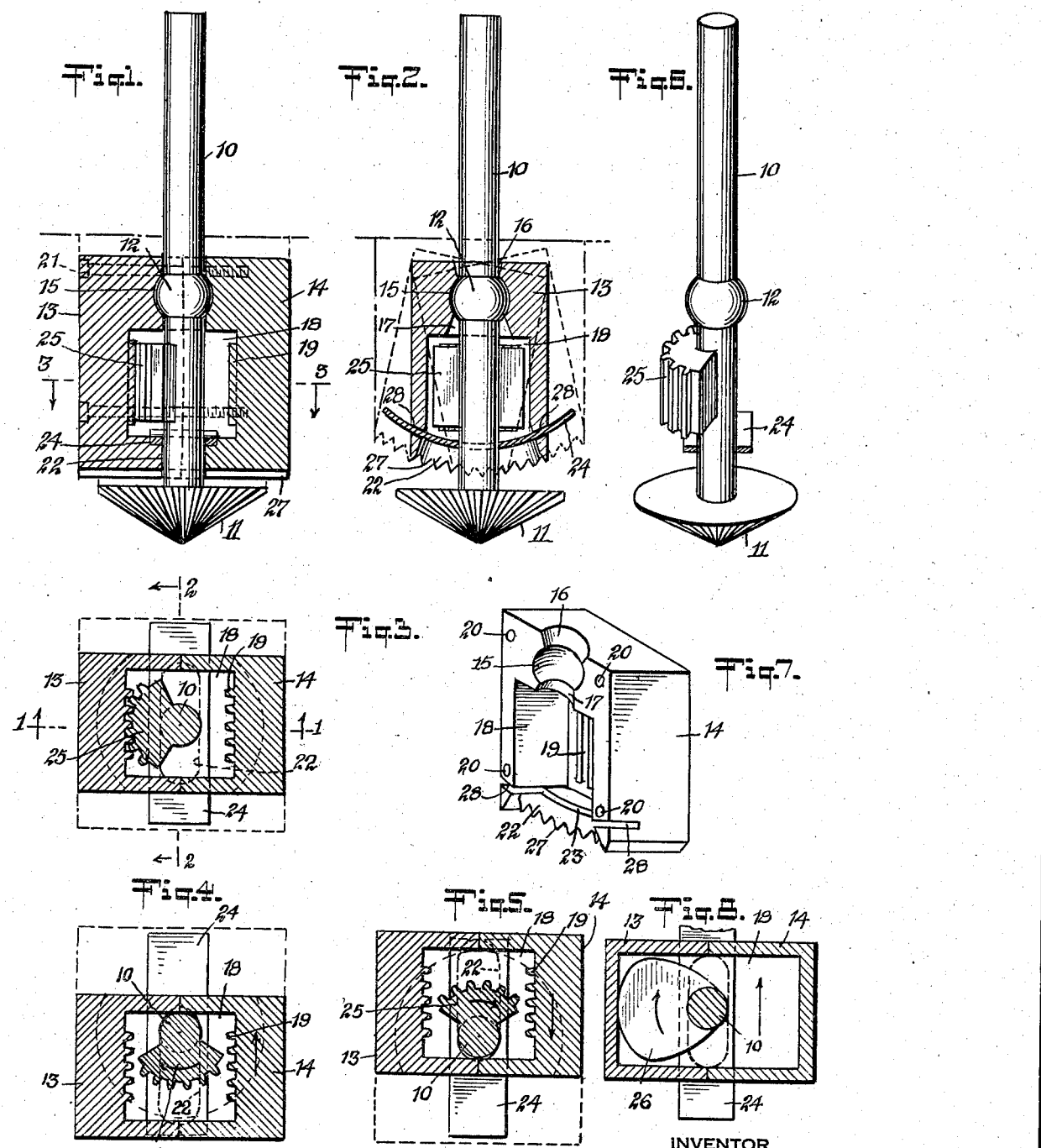

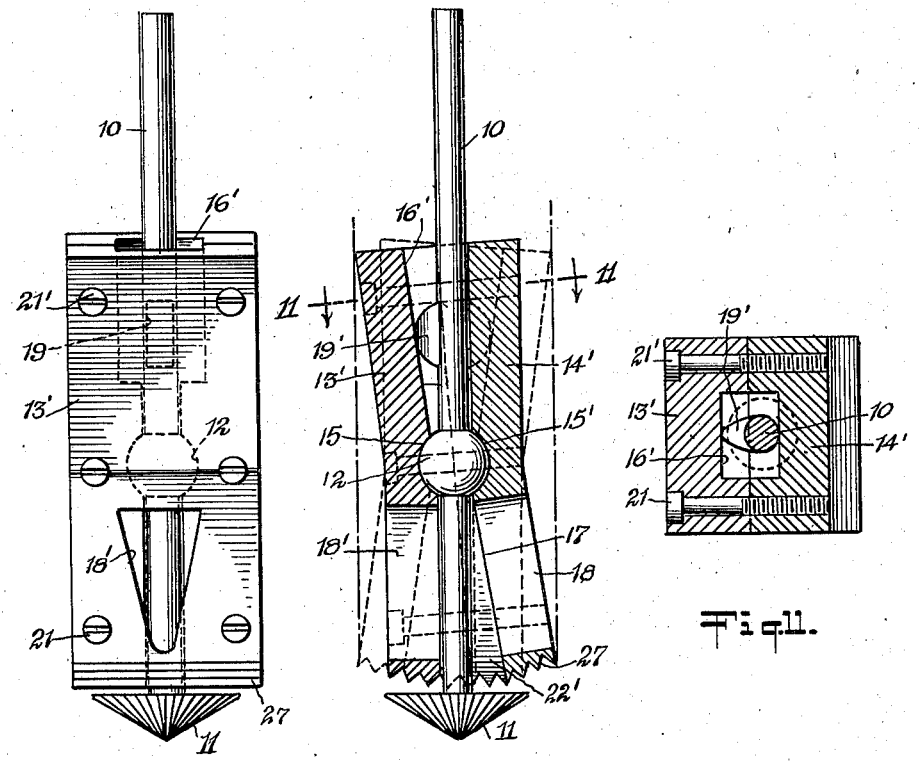

2,453,025

UNITED STATES PATENT OFFICE 2,453,025

DEVICE FOR CUTTING NONCIRCULAR HOLES

Pai Yen Loung, New York, N. Y.

Application March 25, 1948, Serial No. 16,965

7 Claims. (Cl. 77—61)

This invention relates to new and useful improvements in drilling tools and has especial reference to a drilling tool with which non-circular holes may be drilled or cut.

The main object of the invention is to provide a simple, durable, strong and efficient device for cutting non-circular holes.

A further object is to provide a device which is composed of a minimum number of simple parts which can be manufactured at low cost and very quickly and easily assembled and disassembled as desired.

A still further object is to provide a simple device which, after once being started in its drilling operation, will, when power operated, continue working automatically with a minimum of attention thereto required of the operator.

Further and more specific objects, features and advantages will more clearly appear from a consideration of the detailed specification hereinafter set forth, especially when taken in connection with the accompanying drawings which illustrate present preferred forms which the invention may assume and which form part of the specification.

In brief and general terms, the invention includes a drill shaft which may be manually or power driven on the lower end of which is disposed a circular drill of any suitable form. Oscillatably mounted on the shaft above the circular drill is a hollow block having cutting teeth at its lower surface and means on the shaft within the block to cooperate therewith to oscillate the block as the shaft is turned. The circular drill on the lower end of the shaft drills a circular hole almost as large as the desired ultimate hole and then the oscillating cutter subsequently descends following the lower drill and cuts off the corners of the non-circular hole as may be desired.

The preferred present form which the invention may assume is illustrated in the drawings of which—

Fig. 1 is a vertical cross section taken on the line 1—1 of Fig. 3;

Fig. 2 is a vertical cross section taken on the line 2—2 of Fig. 3;

Fig. 3 is a horizontal cross section taken on the line 3—3 of Fig. 1;

Figs. 4 and 5 are similar sections showing the operating mechanism in different positions;

Fig. 6 is a perspective view of the rotary drill shaft and operating gear sector;

Fig. 7 is a perspective view of one-half of the oscillatable cutting block;

Fig. 8 is a section similar to Fig. 5 showing a cam mechanism instead of gears for oscillating the block.

Fig. 9 is an elevation of a modified form of the device;

Fig. 10 is a vertical cross section therethrough; and

Fig. 11 is a horizontal cross section taken on the line 11—11 of Fig. 10.

Referring now merely to the specific forms of the invention shown in the drawings, it will be seen that the invention includes a rotatable drill shaft 10, having on its lower end preferably a circular drill element 11 preferably of the usual tapered shape. The shaft may be manually turned or may be connected to a suitable drive motor if desired.

Intermediate its ends the shaft 10 is preferably provided with a rounded protuberance 12 or knob, preferably integrally formed thereon. Mounted on the shaft 10 for oscillation in a straight line is a hollow block formed of two similar halves 13 and 14. Each half has a curved recess 15 to receive the knob 12, when fitted together, with upper and lower tapered channels 16 and 17 leading therefrom and allowing for the swing of the block on the shaft to prevent binding. The lower channel 17 opens into a large central recess or chamber 18 which in its walls opposite the open faces of the half sections is provided in one form with gear teeth 19. The halves are provided with bolt holes 20 to receive bolts 21 which hold the sections together. The bottom of each section or half is provided with an elongated slot 22 at the upper face of which there is a still wider recess 23 in which rides an elongated strip 24 which seals off the slot from the lower end of the shaft so that chips from the cutting will not get into and clog the chamber 18 when the device is operating. This strip is centrally apertured to surround the shaft 10.

On the shaft 10 within the chamber 18 is formed a gear sector 25 which cooperates with the gear racks 19 to oscillate the block when the shaft 10 is turned. In Fig. 8 there is shown a form in which the chamber has no gear teeth and the shaft 10 is provided with a cam 26 instead of a gear sector. Generally speaking the dimensions of the two halves when placed together are equal in one direction to the width of the hole to be drilled and in the other direction are equal to half the width of the hole although in its swing, as indicated in dotted lines in Fig. 3, the block will cover an area equal to the full area of the hole to be drilled. The bottom of the block sections are provided with cutting teeth 27 which are shown disposed in a curved manner with the center of the knob 12 as their center of curvature. The strip 24 also has a curvature centering on the knob 12 and the block sections are provided with oppositely disposed slits 28 of the same dimensions as the cross section of the strip 24 to allow the block to swing back and forth while the strip remains stationary as shown in Fig. 2. It is, of course, also to be noted that a square will be cut by the form shown in the drawings, although it can be easily imagined how the plan view section of the half sections may be changed in outer shape and curvature to cut oval or similar non-circular holes if desired.

In the operation of the device, assuming that the block sections have been bolted together around the shaft 10, the lower pointed end of the circular drill is placed on the center point of the hole to be cut. The upper end of the shaft may then be turned manually in any usual manner as by a brace or may be connected to the chuck of a drill motor for power operation. As this operation proceeds, the lower drill cuts a round hole deeper and deeper into the surface and is closely followed by the oscillating cutter block, the teeth of which cut away the remaining portions of the desired hole which have not been cut by the lower drill and this of course refers particularly to the corner areas or those areas outside the circular section of the lower drill.

The modified form comprises U-shaped plates 13' and 14' connected by bolts 21' to form a hollow block, but in this case the knob 12 is in the middle of the block where the inner walls thereof approach each other and are provided with suitably shaped recesses 15' to receive the knob. The inner faces of the plates are sloped away from each other as indicated at 16' and 17' being nearer to each other at the middle of their faces and slope farther away from each other as they reach the top and bottom of each plate. Thus there are formed upper and lower openings which permit the block to oscillate around the knob 12 in a manner similar to the previously described form. The bottom of the block is provided with the slot 22' and the lower sides of the plates 13' and 14' are provided with lateral openings 18, 18' to permit the escape of chips therethrough. This construction is somewhat simpler and cheaper to manufacture than the previous form but essentially it operates in substantially the same manner. In this form the shaft 10 above the knob 12 is provided with a cam arm 19' which in rotation contacts the inner walls of the plates 13' and 14' and cause the oscillation of the block.

This device is very easy to handle because of its extremely simple construction and minimum number of parts. After the device is started into the surface the cutting may take place almost automatically with practically no attention on the part of the operator especially when the device is motor-driven. The device must be held in position until the block commences to cut into the surface after which it will maintain itself in the right position. Since most of the work in operating the device is taken by the lower drill, as the block merely cuts away the corners and surplus areas not cut by the lower drill, the block needs less power than the main drill and therefore may be driven by the cam if desired instead of by the gears shown. Which drive is employed will depend largely and naturally upon the nature of the material being drilled.

While the invention has been described in detail and shown with respect to the accompanying drawing, it is not to be limited to such details, since many changes and modifications may be made in the invention without departing from the spirit and scope thereof. Hence, it is desired to cover any and all forms and modifications of the invention which may come within the language and scope of any one or more of the appended claims.

What I claim as my invention is:

1. A drilling device which includes a rotatable shaft having a circular drill at its lower end, an oscillatable hollow block mounted on the shaft, and means on the shaft and within the block to oscillate the block as the shaft is turned, and cutting teeth on the lower face of the block.

2. A drilling device which includes a rotatable shaft having a circular drill at its lower end and a protuberance intermediate its ends, a sectional hollow block embracing said shaft and swivelled around said protuberance for oscillatory motion, means on the shaft and within the block to oscillate the block as the shaft is turned, and cutting teeth on the lower face of the block.

3. A drilling device which includes a rotatable shaft having a circular drill at its lower end, a hollow oscillatable block disposed on the shaft above the lower drill, means to swivel the block on the shaft for oscillatory movement, teeth on the lower face of the block, and means on the shaft cooperating with means within the block to oscillate the block as the shaft is turned.

4. A drilling device which includes a rotatable shaft, a circular drill at its lower end, a sectional hollow block surrounding the shaft with its lower face just above the drill, teeth on the lower face of the block, means for swivelling the block on the shaft for oscillatory movement, and cooperating means on the shaft and the block and disposed within the block to oscillate the block as the shaft is turned.

5. A drilling device which includes a rotatable shaft, a circular drill on the lower end thereof, a protuberance on the shaft intermediate its length, a gear sector on the shaft between the protuberance and the drill, a sectional block adapted to be disposed around the shaft and having a recess to receive said protuberance so that the block may oscillate on the shaft, said block having a chamber in which lies said gear sector and a bottom elongated slot through which extends said shaft, racks on opposite sides of said chamber to coact with said sector to oscillate the block, teeth on the lower face of said block, a strip apertured to embrace said shaft and disposed in said chamber above said slot to seal the same, said block having slits in opposite walls thereof to receive the ends of the strip and permit oscillation of the block while sealing said slot.

6. A drilling device which includes a rotatable shaft, a circular drill on its lower end, a sectional hollow block surrounding said shaft, the adjacent walls of the sections being relatively divergent from the middle of each section to form openings therebetween, a knob on the shaft, said sections having recesses at their mid portions to receive said knob, and means on the shaft and lying in one of said openings to engage the walls of the sections as the shaft is rotated and oscillate said block.

7. A drilling device which includes a rotatable shaft, a circular drill on its lower end, a sectional hollow block surrounding said shaft, the adjacent walls of the sections being relatively divergent from the middle of each section to form openings therebetween, a knob on the shaft, said sections having recesses at their mide portions to receive the knob, and a cam arm on the shaft and lying in the opening in the block above said knob to engage the walls of said opening to engage the walls of the said sections as the shaft is rotated and oscillate said block.

PAI YEN LOUNG.

No references cited.